United States Patent
Berionne et al.

(10) Patent No.: US 9,094,433 B2
(45) Date of Patent: Jul. 28, 2015

(54) SYSTEMS AND METHODS FOR BEARER INDEPENDENT PROTOCOL GATEWAY OPTIMIZATION

(75) Inventors: Michele Berionne, San Diego, CA (US); Rajiv Kumar Vijayakumar, La Jolla, CA (US); Anil Kumar Taleppady, San Diego, CA (US); Damir Didjusto, San Diego, CA (US); Xiaomin Zhu, San Diego, CA (US); Jose Alfredo Ruvalcaba, Winchester, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 13/535,221

(22) Filed: Jun. 27, 2012

(65) Prior Publication Data

US 2014/0003248 A1    Jan. 2, 2014

(51) Int. Cl.
*H04L 29/08* (2006.01)

(52) U.S. Cl.
CPC .................................... *H04L 67/14* (2013.01)

(58) Field of Classification Search
None
See application file for complete search history.

(56) References Cited

U.S. PATENT DOCUMENTS

| 7,080,120 | B2  |    | 7/2006  | Betros et al. |
| 7,269,186 | B2  | *  | 9/2007  | Abrol et al. ................... 370/476 |
| 7,280,847 | B2  | *  | 10/2007 | Goldthwaite et al. ........ 455/558 |
| 7,933,585 | B2  | *  | 4/2011  | Boussoukaia et al. ..... 455/412.1 |
| 7,953,878 | B1  |    | 5/2011  | Trimble |
| 8,073,937 | B2  | *  | 12/2011 | Martinent et al. ............ 709/221 |
| 2006/0123123 | A1 |  | 6/2006  | Kim et al. |
| 2006/0203804 | A1 |  | 9/2006  | Whitmore et al. |
| 2007/0239857 | A1 | * | 10/2007 | Mahalal et al. ............... 709/219 |
| 2009/0191917 | A1 | * | 7/2009  | Zappulla et al. .............. 455/558 |
| 2009/0307358 | A1 | * | 12/2009 | Poujol et al. .................. 709/228 |
| 2010/0309909 | A1 |  | 12/2010 | Shiraishi |

FOREIGN PATENT DOCUMENTS

| EP | 2131528 A1 | 12/2009 |
| GB | 2427331 A  | 12/2006 |
| JP | 2009094609 A | 4/2009 |

OTHER PUBLICATIONS

International Search Report and Written Opinion—PCT/US2013/047977—ISA/EPO—Oct. 24, 2013.

* cited by examiner

*Primary Examiner* — Hassan Kizou
*Assistant Examiner* — Roberta A Shand
(74) *Attorney, Agent, or Firm* — Abdollah Katbab

(57) ABSTRACT

Systems, methods, and devices for bearer independent protocol gateway performance optimization are described. In one aspect, a bearer independent protocol gateway is provided in the device which includes a traffic analyzer configured to detect when HTTP transaction(s) (request and corresponding responses) is/are completed and to switch to the next socket as soon as the transaction is completed, without necessarily waiting for the TCP socket to be closed. For example, when the gateway detects that the response is complete, it may push the current socket back into a socket queue and start serving the next socket.

22 Claims, 7 Drawing Sheets

US 9,094,433 B2

SYSTEMS AND METHODS FOR BEARER INDEPENDENT PROTOCOL GATEWAY OPTIMIZATION

BACKGROUND

1. Field

The present application relates generally to communication devices, and more specifically to systems, methods, and devices for bearer independent protocol gateway performance optimization.

2. Background

Bearer independent protocols (BIPs) have been developed which allow data and services to be provided from a smart card. A smart card may generally refer to a medium including a data storage which may be coupled with a communication device. Examples of smart cards include subscriber identify module (SIM) cards, universal subscriber identity module (USIM) cards, a universal integrated circuit (UICC) card, removable user identify module (R-UIM), CDMA subscriber identity module (CSIM), and the like.

One way data and services may be provided is through the use of a smart card web server. The smart card may include data which causes the instantiation and configuration of a web server by a processor of the device coupled with the smart card. The smart card web server may be configured to use a bearer independent protocol to provide content defined by the operator, who may own the smart card, to the end user using a web browser of the device and standard web technologies as the display interface. For example, the smart card may include an e-wallet application that may be accessed via a web browser executing on the device (e.g., smartphone, featurephone). This web server may provide a packet based interface (e.g., HTTP over TCP/IP) to access data and services on the smart card via the bearer independent protocol.

To bridge the two protocols, a bearer independent protocol gateway may be included. The bearer independent protocol gateway may be configured to send and receive packet based signals to clients and to send and receive bearer independent protocol signals to the smart card.

A limited number of channels may be provided for communicating with the smart card. For example, the number of concurrent BIP channels that may be opened to a smart card may be limited (e.g., 3, 8, or 5). Clients accessing the data (e.g., web browsers) may be configured to open several socket connections to obtain the information. As such, the number of sockets from a client may exceed the number of available BIP channels. How the communications between the smart card and the clients are managed may impact the performance of the service and speed with which the data is transmitted. Therefore, systems, methods, and devices for bearer independent protocol gateway performance optimization are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include increasing the efficiency of the utilization of a bearer independent protocol channel.

In one innovative aspect, a method of socket management is provided. The method includes receiving data from an application to be communicated via a packet-based protocol from at least two sockets. The method further includes transmitting data from one of the at least two sockets via a bearer independent protocol channel. The method also includes receiving a data response based at least in part on the transmitted data. The method includes determining whether data communication is complete based at least in part on the received data response. If the determination indicates data communication is complete, the method includes transmitting data via another of the at least two sockets via the bearer independent protocol channel. If the determination indicates data communication is incomplete, the method continues transmitting data via the one of the at least two sockets.

In another innovative aspect, an apparatus for managing socket connections is provided. The apparatus includes a client circuit configured to receive data from an application to be communicated via a packet-based protocol from at least two sockets. The apparatus includes a card circuit. The card circuit is configured to transmit data from one of the at least two sockets via a bearer independent protocol channel to the smart card. The card circuit is further configured to receive a data response based at least in part on the transmitted data. The apparatus also includes a traffic analyzer configured to determine whether data communication is complete based at least in part on the received data response. The client circuit is further configured to, if the determination indicates data communication is complete, transmit data via another of the at least two sockets via the bearer independent protocol channel. The client circuit is also configured to, if the determination indicates data communication is incomplete, continue transmitting data via the one of the at least two sockets.

In a further innovative aspect, another apparatus for managing socket connections is provided. The apparatus includes means for client application communication configured to receive data from an application for communication via a packet-based protocol from at least two sockets. The apparatus includes means for data communication. The means for data communication may be configured to transmit data from one of the at least two sockets via a bearer independent protocol channel. The means for data communication may be further configured to receive a data response based at least in part on the transmitted data. The apparatus also includes means for analyzing traffic configured to determine whether data communication is complete based at least in part on the received data response. The means for client application communication may be further configured to, if the determination indicates data communication is complete, transmit data via another of the at least two sockets via the bearer independent protocol channel. The means for client application communication may also be configured to, if the determination indicates data communication is incomplete, continue transmitting data via the one of the at least two sockets.

A computer-readable storage medium comprising instructions executable by a processor of an apparatus is provided in another innovative aspect. The instructions cause the apparatus to receive data from an application for communication via a packet-based protocol from at least two sockets. The instructions cause the apparatus to transmit data from one of the at least two sockets via a bearer independent protocol channel. The instructions cause the apparatus to receive a data response based at least in part on the transmitted data. The instructions cause the apparatus to determine whether data communication is complete based at least in part on the received data response. If the determination indicates data communication is complete, instructions cause the apparatus to transmit data via another of the at least two sockets via the bearer independent protocol channel. If the determination indicates data communication is incomplete, instructions cause the apparatus to continue transmitting data via the one of the at least two sockets.

DETAILED DESCRIPTION

Figure 1:
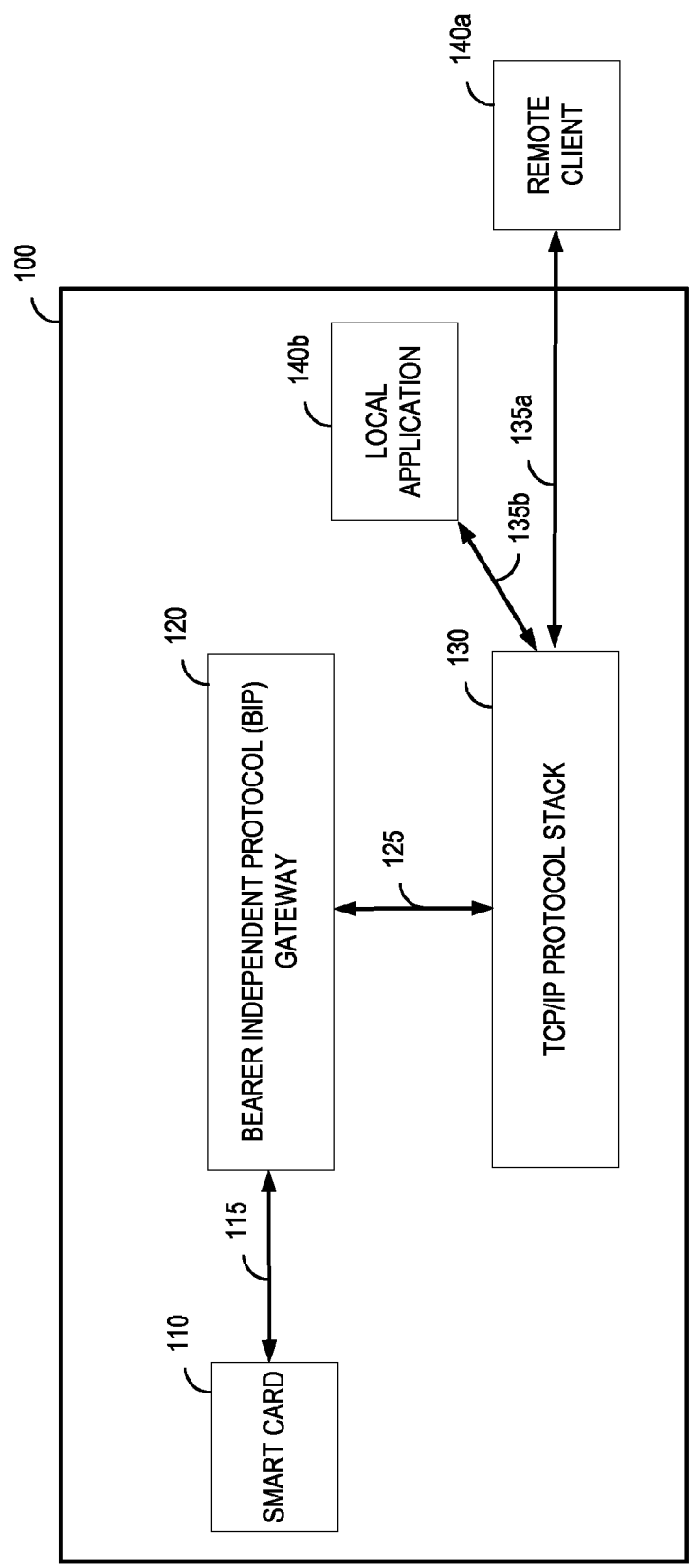
FIG. 1 shows a functional block diagram of an example of a communication device.

A smart card web server may generally refer to a web server running on a smart card that is coupled with a device. The smart card web server may be used to provide contents defined by a network operator, who may own the smart card, to the end user using the web browser of the device and standard web technologies as interface. The smart card web server may be configured to use a BIP (bearer independent protocol) protocol, such as that described in ETSI 102 223, while the browser may use a packet based stack, such as a TCP/IP stack. A module which may be referred to as a BIP gateway may be provided to convert BIP protocol into TCP/IP and vice versa to allow the communication of data between the smart card and a client.

Resources on smart cards may be scarce. Some cards may be configured to open a single BIP channel. On the other hand, TCP sockets are generally available and commercial browsers open many sockets at the same time to download resources (e.g., web page, images, cascading style sheets, javascripts and so on) in parallel to improve performance. The BIP gateway may be configured to serialize the requests coming from browser and send them in sequence to the smart card web server, over the single BIP channel. Many commercial HTTP protocol stacks may keep the TCP/IP connection open for several seconds after finishing downloading the requested content. This configuration may be included to re-use the same socket if a new content is required from the same server. The re-use may save the time and network resources for a new TCP handshake.

However, this mechanism may cause the BIP channel to remain busy for a period of time after the data communication is complete thereby delaying subsequent transmissions. This delay may cause performance issues (e.g., several seconds between each content transmission).

In some implementations, the BIP gateway may use the BIP channel when the TCP socket is connected (e.g., status from LISTEN to ESTABLISHED) until the socket is explicitly closed by either the server or the client. At this point, the BIP gateway may release the BIP channel (e.g., status from ESTABLISHED to LISTEN) and immediately start using the same BIP channel for the next socket in the queue (e.g., status from LISTEN to ESTABLISHED). As discussed above, there may be delay in receiving the close signal.

Accordingly, a BIP gateway is provided in the device which includes a traffic analyzer configured to detect when data communication, such as the HTTP transaction(s) (request and corresponding responses), is/are completed and to switch to the next socket as soon as data communication is completed, without necessarily waiting for the TCP socket to be closed. For example, when the BIP gateway detects that the response is complete, it may push the current socket back into a socket queue and start serving the next socket. This implementation reduces the delay caused by the TCP socket being open and not used.

The method of detecting a completed data communication may include analyzing the HTTP header information such as the content length as well as the number of bytes transmitted. When the number of bytes transmitted equals the expected content length, the BIP gateway may be configured to switch to the next socket at this point rather than waiting for the socket to close.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In some implementations an access terminal may comprise a cellular telephone, a cordless telephone, a Session Initiation Protocol ("SIP") phone, a wireless local loop ("WLL") station, a personal digital assistant ("PDA"), a handheld device with or without wireless connection capability, or some other suitable processing device connected to a modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a bearer independent protocol with a smart card.

Such devices which may include the features described may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 shows a functional block diagram of an example of a communication device. The communication device 100 may be implemented as one or more of the devices discussed above. The communication device 100 includes a smart card 110. The smart card 110 may be provided via a port (not shown). The smart card 110 may include information which may be used to configure a processor included in the communication device 100. More specifically, the smart card 110 may include configuration information for bearer independent protocol communication. For example, the smart card 110 may include instructions for instantiating a smart card web server. As such, the smart card 110 may communicate via a bearer independent protocol channel 115. The bearer independent protocol channel 115 may provide a communication pathway to a bearer independent protocol gateway 120. The bearer independent protocol gateway 120 may be configured to send and receive bearer independent protocol communications to the smart card one 110 via the bearer independent protocol channel 115. The bearer independent protocol gateway 120 may be configured to manage multiple bearer independent protocol channels. However, in some implementations, the number of bearer independent protocol channels may be limited. For example, the bearer independent protocol gateway 120 may be configured to maintain three channels with the smart card 110.

The bearer independent protocol gateway 120 may be configured to transmit information via a packet interface 125 to a packet protocol stack 130. As shown in FIG. 1, the packet interface 125 may be a TCP/IP packet based interface. Accordingly, the packet protocol stack 130, as shown, is a TCP/IP protocol stack.

The packet protocol stack 130 may be configured to provide a packet based communication pathway to the smart card 110. For example, a packet based communication pathway 135*a* may be established to allow a remote client 140*a* to communicate with the smart card 110. The remote client 140*a* may be located on a network and accessed by the communication device 100. For example, the remote client 140*a* may be an application executed on device (e.g., server) hosted by the network operator. The remote client 140*a* may be configured to send or receive data to the smart card 110 included in the communication device 100.

A second packet based communication pathway 135 be may be provided to allow a local application 140*b* to communicate with the smart card 110. The local application 140*b* may be executing on a processor included in the communication device 100. Examples of the local application 140*b* include a web browser, an e-wallet application, a calendar application, or the like.

The remote client 140*a* and the local application 140*b* may be collectively referred to as clients. In some implementations, the smart card 110 may provide services which may be accessed by the clients. For example, the smart card 110 may provide a payment service. When the smart card 110 is coupled with the communication device 110, clients may send and/or receive information stored on the smart card 110. The remote client 140*a* may provide current balance information upon request from the smart card 110. The local application 140*b* may display an interface including the balance information.

Figure 2:
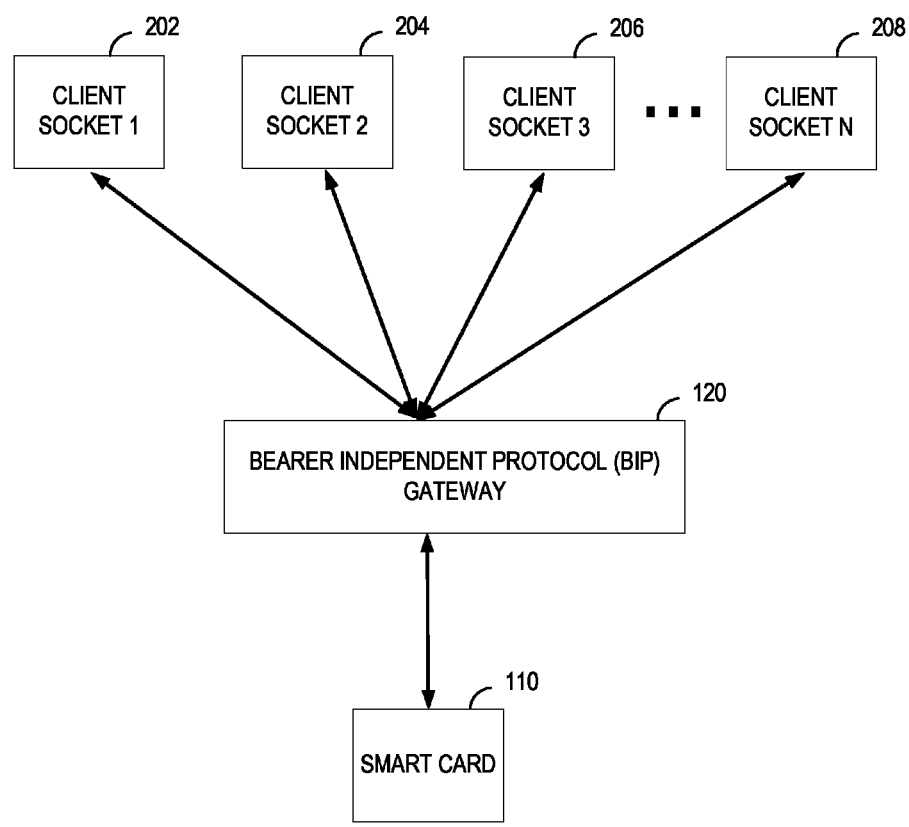
FIG. 2 illustrates a functional block diagram of an example communication pathway to a smart card.

FIG. 2 illustrates a functional block diagram of an example communication pathway to a smart card. As shown in FIG. 2, the smart card 110 may be coupled with the bearer independent protocol gateway 120. The coupling between the bearer independent protocol gateway 120 and the smart card 110 may be referred to as a channel. This channel may be configured to transmit data according to a bearer independent protocol. The bearer independent protocol gateway 120 may be configured to send and/or receive information from multiple client sockets. In packet-based communication systems, a socket generally refers to a point of connection between two entities such as between a client and the bearer independent protocol gateway 120. As shown in FIG. 2, a first client socket 202, a second client socket 204, and a third client socket 206 are coupled with the bearer independent protocol gateway 120. Additional client sockets 208 may be included.

Each client socket may be used to request data. For example, if the client is loading and HTML page, the HTML page may include various elements such as text, image, video, audio, and other types of data. The client may open a socket for each element of the HTML page. Each client socket may be associated with a different client application. In some implementations, one or more sockets may be associated with the same client application.

As discussed above, the bearer independent protocol gateway 120 may have limited channels to communicate with the smart card 110. As such, the sockets may not be processed in parallel. Instead, the communication device 100 may be configured to process the first client socket 202 request and upon completion, begin servicing the second client socket 204 request.

The bearer independent protocol gateway 120 may be configured to determine when a client socket request has completed. In some implementations, an explicit signal may be transmitted by the client (e.g., 140*a* or 140*b*) indicating the completion of a session via a client socket. In some implementations, the client may keep a client socket open after the requested data has been received at the client anticipating possible future communications via the socket. In such implementations, the bearer independent protocol gateway 120 may wait for future communications which may never come. Thus, the bearer independent protocol gateway 120 may delay processing requests from other client sockets.

Figure 3:
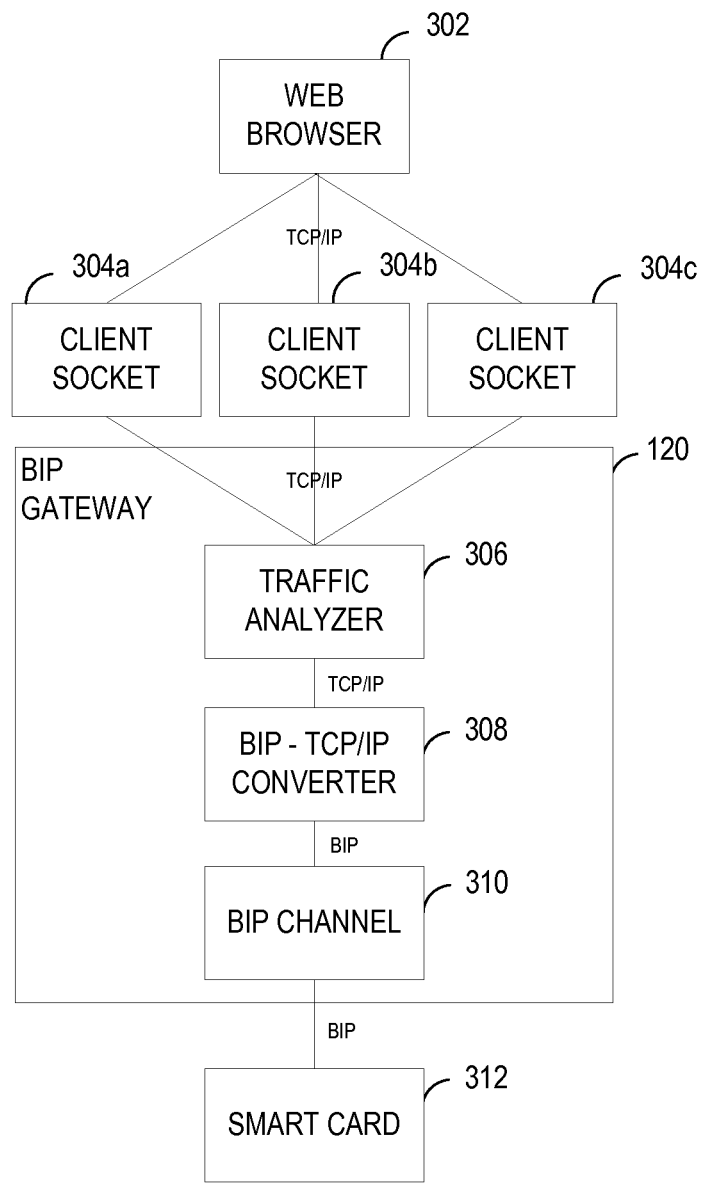
FIG. 3 illustrates a functional block diagram of an example of a communication device including a traffic analyzer.

FIG. 3 illustrates a functional block diagram of an example of a communication device including a traffic analyzer. As shown in FIG. 3, the client is a web browser 302. The web browser 302 may open one or more client sockets to the BIP gateway 120. As shown, three client sockets 304*a*, 304*b*, and 304*c* have been opened. The web browser 302 may communicate via a packet based protocol such as TCP/IP via the client socket 304.

The bearer independent protocol gateway 120 may include a traffic analyzer 306. The traffic analyzer 306 may be configured to receive packet communications sent to and/or from the bearer independent protocol gateway 120. The traffic analyzer 306 may be configured to identify one or more characteristics of the data and manage switching between client sockets 304. The traffic analyzer 306 will be described in further detail below.

The traffic analyzer 306 may be coupled with a bearer independent protocol/packet converter 308. As shown in FIG.

3, the packet protocol is TCP/IP. The bearer independent protocol/packet converter 308 may be configured to parse packet data received from a client and generate one or more bearer independent protocol signals for transmission to a smart card 312. The bearer independent protocol/packet converter 308 may be configured to parse bearer independent protocol signals received from the smart card 312 and generate one or more packet based signals for transmission to a client, such as the web browser 302.

The bearer independent protocol/packet converter 308 may be coupled with a bearer independent protocol channel 310. The bearer independent protocol channel 310 may be configured to provide information to and/or receive information from the smart card 312.

Although a number of separate components are illustrated in FIG. 3, those of skill in the art will recognize that one or more of the components may be combined or commonly implemented. For example, the bearer independent protocol/packet converter 308 may be used to implement not only the functionality described above with respect to the bearer independent protocol/packet converter 308, but also to implement the functionality described above with respect to the traffic analyzer 306. Further, each of the components illustrated in FIG. 3 may be implemented using a plurality of separate elements.

Figure 4:
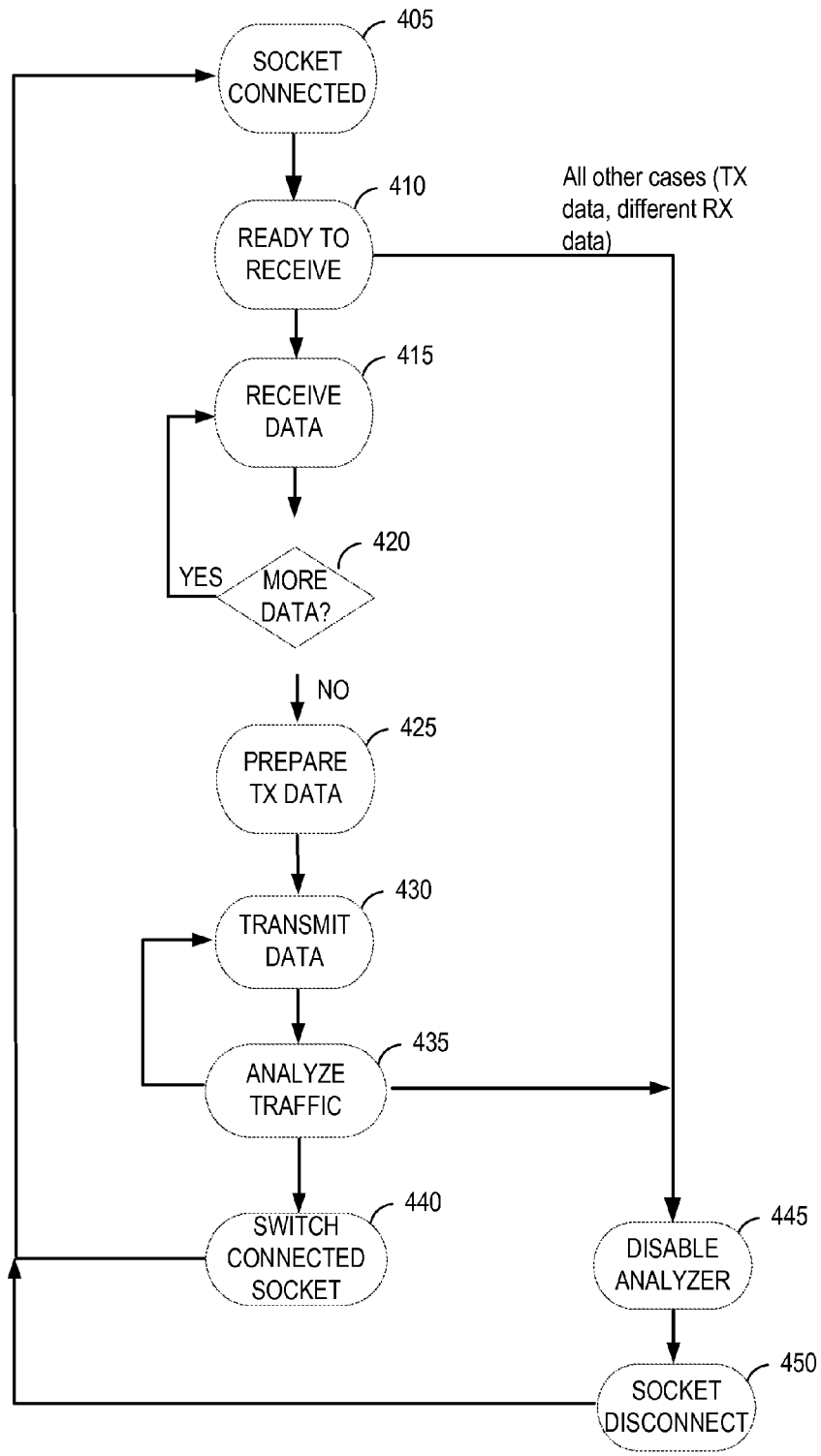
FIG. 4 illustrates a process flow diagram of an example request from a client to a smart card.

FIG. 4 illustrates a process flow diagram of an example request from a client to a smart card. At block 405, the client socket is connected. At block 410, the communication device is ready to receive data. At block 415, data is received from the client via the socket. At block 420, a determination is made as to whether more data is to be received. The determination at block 420 may be based on header information included in the packet data received. If additional data is to be received, the flow continues to block 415 as described above. If no more data is expected, the flow continues to block 425.

At block 425, the data to be transmitted responsive to the request is prepared. For example, if the received data requests an image file, be image file may be located at block 425. At block 430, the data is transmitted from the smart card. The data may be converted from bearer independent protocol to packet-based protocol as discussed above. At block 435, the traffic may be analyzed. The analysis of the traffic will be discussed in further detail in reference to FIG. 5 below.

If the analysis determines that more data will be transmitted, the flow returns to block 430. If the analysis determines that data communication is complete, the process may continue to block 440 where the connected socket is switched. Switching the connected socket may include identifying one socket which the client has opened, but has not yet transmitted information to the smart card through. The switching may be based on the order the sockets are queued, the request pending via the socket, the client opening the socket, or other factors associated with the data to be communicated (e.g., type, quantity, association with previously transmitted data), the client associated with the communication, or the order in which the socket was opened. Upon switch, the flow continues to block 405 as described above.

If the analysis determines that more data than expected has been transmitted, the traffic analyzer may not be able to accurately determine when data communication via a client socket has completed. As such, the traffic analyzer may be disabled thereby avoiding switching for this socket until the client socket is explicitly closed, such as by the client. At block 450, the socket is disconnected such as via timeout or signaling from the client. Upon close, the flow continues to block 405 as described above.

As can be seen in the process flow of FIG. 4, based on the traffic analysis, the socket switching may take place prior to an explicit socket disconnect. In the implementations where the client may retain a socket after receiving the data transmission, the gateway may switch and begin processing another client socket based on the traffic analysis.

Figure 5:
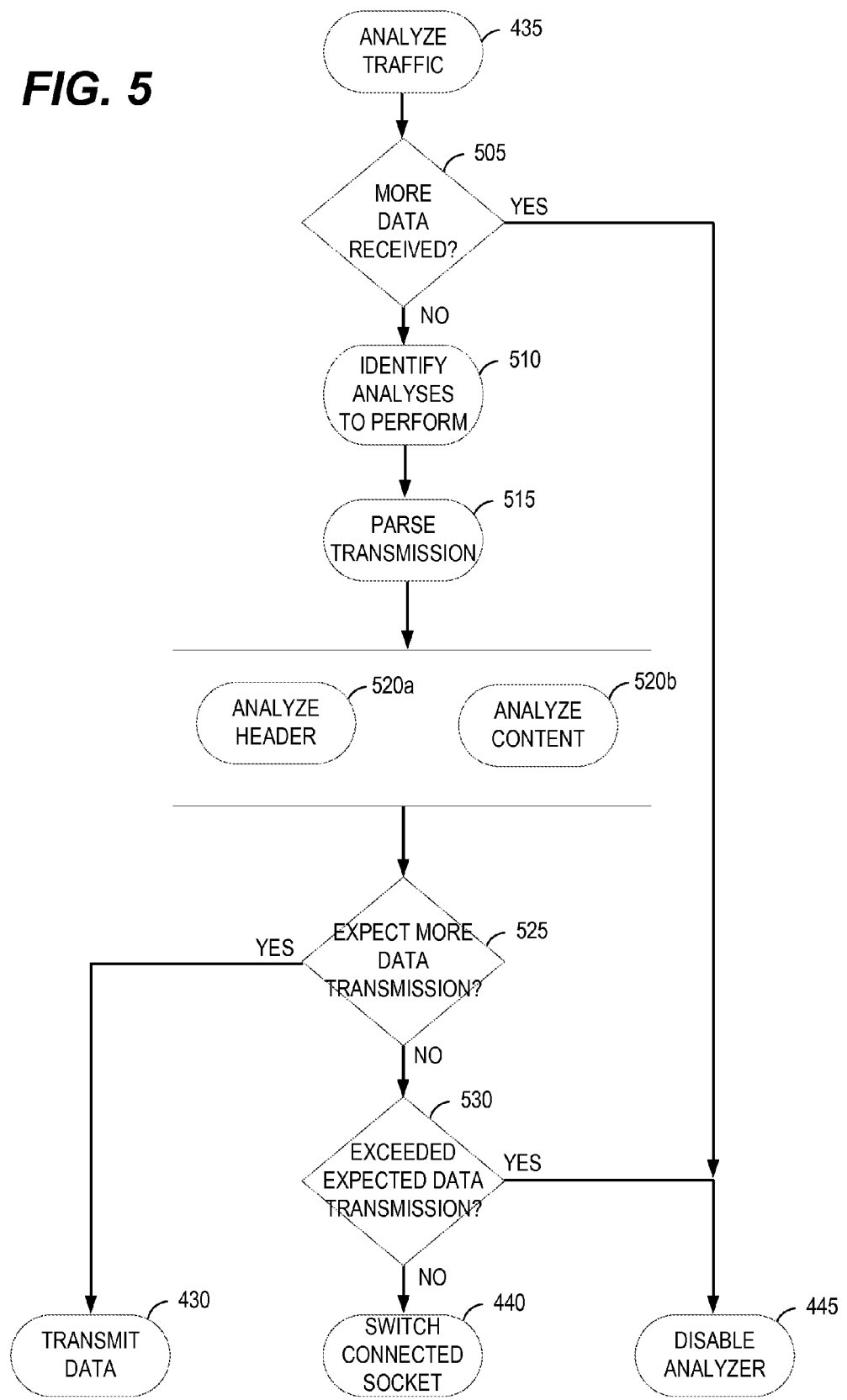
FIG. 5 illustrates a process flow diagram of an example of the traffic analysis.

FIG. 5 illustrates a process flow diagram of an example of the traffic analysis. The traffic analysis process shown in FIG. 5 may be implemented in a traffic analyzer 306 as described above. At block 435, the traffic may be analyzed. The traffic analyzer may be configured to analyze packet data from a client or converted packet data from a smart card. At decision block 505, a determination is made as to whether more data is received. In an implementation where the traffic analyzer is analyzing data transmitted in response to a request from the client, if additional information is received via the socket from the client, the process may disable the analyzer and thus traffic-based switching. If no additional data has been received from the client, the flow continues to block 510.

At block 510, analyses to be performed are identified. The analyses may be stored in a memory associated with the communication device. The analyses may be identified based on the client, the smart card, the data received, the data transmitted, or the like. The analyses may include information to parse values from the data to perform the analysis. For example, the information may identify a header field name or a location (e.g., character position) that may be used by a parser to identify a value of interest.

At block 515, the parsing information may be applied to identify values for analysis. For example, the parser may identify HTTP and/or TCP/IP analysis criteria. As shown in FIG. 5, analysis may be performed on the packet header at block 520a and at the packet content 520b. An example header field that may be parsed and analyzed is the content length. The content length header field in some packet based protocols (e.g., HTTP) may indicate the quantity of data to be transmitted. For example, if the data transmitted is an image file, the header may include the size of the image file in bytes.

At block 525, a determination is made as to whether more data transmission is to be expected. In the example of an analysis based on content length, a counter of the number of bytes transmitted may be maintained. The determination may include comparing the number of bytes transmitted to the value extracted from the content length header field. If the amount transmitted is less than the value specified in the content length header field, more data may be expected. In such implementations, the flow may continue to block 430 to continue data transmission.

If no further data is to be expected, the flow continues to block 530 where a determination is made as to whether the transmission exceeded the expected data transmission. For example, if the number of bytes transmitted is greater than the value specified in the content length header field, the traffic analyzer may not be able to accurately determine when data communication is complete. As such, flow may continue to block 445 where the traffic analyzer is disabled as discussed above.

If no further data is expected and the data transmission does not exceed the expected data transmission, the traffic analyzer may have successfully identified the situation where the data communication is complete. In this case, the flow continues to block 440 where the connected socket may be switched as discussed above.

Although the flow shown in FIG. 5 is based on the content length header field, other header fields or content characteristics may be used for traffic analysis. For example, if the content header type is identified as image data, and the content is identified as text, the analyzer may be disabled. Some packet-based protocols may allow custom header fields in such implementations, the custom header field may be identified as a basis for analysis. For example, a custom field may include a termination sequence. The termination sequence may identify the end of a transmission. The traffic analyzer may be configured to identify the presence of termination sequence to determine the completion of a transmission.

Figure 6:
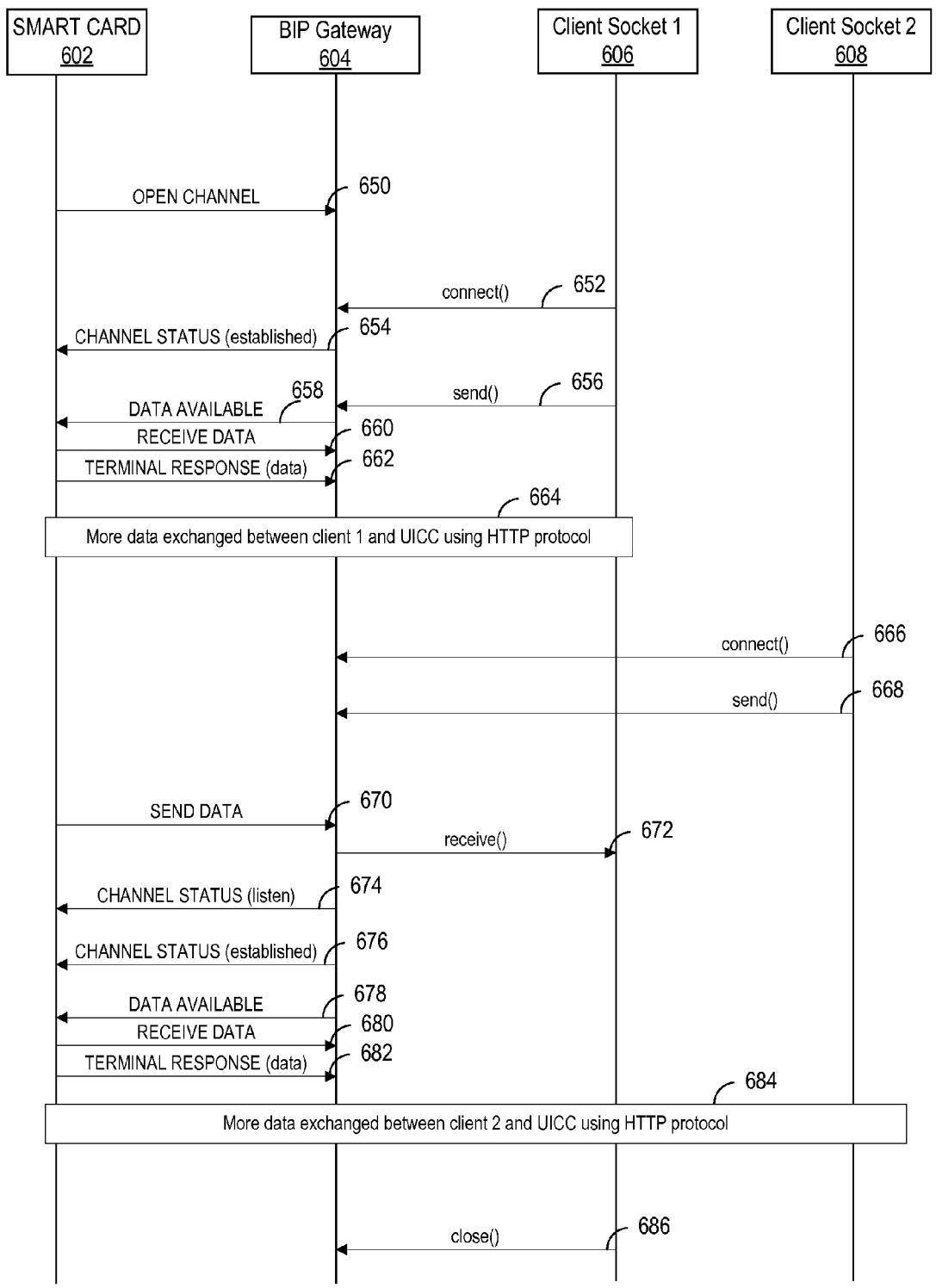
FIG. 6 illustrates a call flow diagram of an example of a switched socket communication session.

FIG. 6 illustrates a call flow diagram of an example of a switched socket communication session. The call flow diagram shown in FIG. 6 illustrates some of the entities which may be included in the systems described above. The entities shown in FIG. 6 include a smart card 602, a bearer independent protocol gateway 604, a first client socket 606, and a second client socket 608.

A smart card 602 may transmit a signal 605 to open a bearer independent protocol channel. The signal 605 may be transmitted to the bearer independent protocol gateway 604. The channel may be opened prior to any communication from a client. The first client socket 606 may transmit a connect signal 652 to the bearer independent protocol gateway 604. The bearer independent protocol gateway 604 may establish the channel via signal 654. Once established, the first client socket 606 may transmit a send signal 656 to the bearer independent protocol gateway. The send signal 656 may be a request for data from the smart card 602. The bearer independent protocol gateway 604 may translate this request 656 to bearer independent protocol and transmit a data available signal 658. In response, the smart card 602 may transmit a received data signal 660 followed by a terminal response signal 662. The terminal response signal 662 may include all or part of the data requested. In some implementations, the terminal response signal 662 may include an acknowledgement that the requested data is available. Additional signaling 664 may be performed to exchange data between the client socket 606 and the smart card 602 via the bearer independent protocol gateway 604. As the signaling is performed, the bearer independent protocol gateway 604 may analyze the traffic as described above.

The second client socket 608 may transmit a signal 666 to connect to the bearer independent protocol gateway 604. As shown in FIG. 6, the first client socket 606 may still be exchanging data when the second client socket 608 transmits signal 666. The bearer independent protocol gateway 604 may be configured to successfully establish the connection and cache the data as if the channel to the smart card 602 is available. Once connected, the second client socket 608 may send data (e.g., a request) to the bearer independent protocol gateway 604.

Signal 670 may be include further data responsive to the request 656 transmitted by the first client socket 606. The bearer independent protocol gateway 604 may analyze the sent data as described above. For example, the bearer independent protocol gateway 604 may peek into the data transmission to detect the end of the HTTP transaction with the first client socket 606. The data may be transmitted to the first client socket via signal 672.

As shown in FIG. 6, the data sent via signals 670 and 672 may be the end of the HTTP transaction with the first client socket 606. Via signals 674 and 676, the bearer independent protocol gateway 604 may simulate the closure of the first socket and the opening of a new socket. Note that no explicit request has been received from the first client socket to close the pathway. Signals 678, 680, and 682 may include the request transmitted at signal 668 by the second client socket 608, and cached by the bearer independent protocol gateway 604. The signals 678, 680, and 682 are similar to the signals described above, namely signals 658, 660, and 662.

Having thus switched to serving the second client socket 608, additional data may be exchanged between the second client socket 608 and the smart card 602 via signaling 684. As such, the second client socket 608 is able to exchange data with the smart card 604 before an explicit close signal 686 is transmitted from the first client socket 608 to the bearer independent protocol gateway 604.

Figure 7:
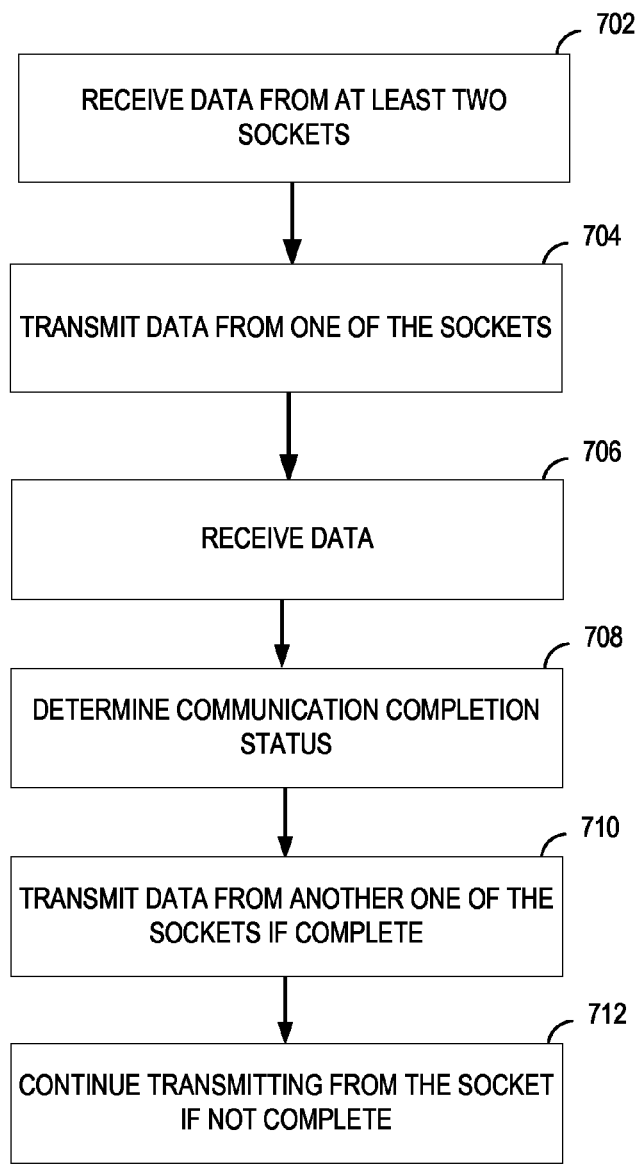
FIG. 7 shows a process flow diagram of a method of socket management.

FIG. 7 shows a process flow diagram of a method of socket management. The process shown in FIG. 7 may be implemented in one or more of the devices described above, such as that in FIG. 3, or below in FIG. 8. At block 702, data is received from an application. The data is to be communicated via a packet-based protocol from at least two sockets. For example, in some implementations, the communication may be via HTTP to a smart card from at least two sockets. The received data may include a request for information such as request for an image or other file resource. The received data may include information for submission such as transaction information to update an electronic wallet. In some implementations, the received data may not require a response. In some implementations, the response may include a signal including an acknowledgment value.

At block 704, data from one of the at least two sockets is transmitted via a bearer independent protocol channel. At block 706, a data response is received. The received data may be based at least in part on the transmitted data. For example, the received data may be an image file transmitted in response to a request for the image. As another example, in an implementation where the communication is not associated with a file resource, the response may include an acknowledgment value.

At block 708, a determination is made as to whether data communication is complete. The determination may be based at least in part on the received data response. At block 710, if the determination indicates data communication is complete, data is transmitted from another of the at least two sockets via the bearer independent protocol channel. At block 712, if the determination indicates data communication is incomplete, data transmission is continued from the one of the at least two sockets.

Figure 8:
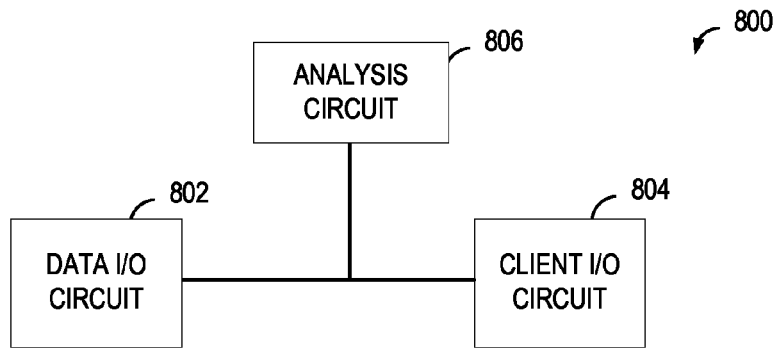
FIG. 8 illustrates a functional block diagram of an example apparatus for bearer independent protocol socket management.

FIG. 8 illustrates a functional block diagram of an example apparatus for bearer independent protocol socket management. Those skilled in the art will appreciate that a socket management apparatus may have more components than the simplified apparatus 800 shown in FIG. 8. The apparatus 800 shown includes only those components useful for describing some prominent features of implementations within the scope of the claims. The apparatus 800 includes a data input output circuit 802, a client input output circuit 804, and an analysis circuit 806.

The data input output circuit 802 may be configured to receive and transmit data via a bearer independent protocol channel. The data input output circuit 802 may include one or more of a comparator, a filter, a processor, a signal generator, and a transceiver. In some implementations, the means for data communication may include the data input output circuit 802.

The client input output circuit 804 may be configured to receive and transmit data from and to an application via a packet-based protocol. The client input output circuit 804 may include one or more of a processor, a signal generator, a transceiver, and a decoder. In some implementations, the means for client application communication may include the client input output circuit 804.

The analysis circuit 806 may be configured to determine whether data communication between the data input output circuit 802 and the client input output circuit 804 is complete. The analysis circuit 806 may be configured to transmit a signal causing the switching of sockets managed by the client input output circuit 804. The analysis circuit 806 may include one or more of a memory, a processor, a comparator, and arithmetic unit, and a signal generator. In some implementations, the means for analyzing traffic may include the analysis circuit 806.

Used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device and/or smart card as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device or smart card coupled therewith can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of socket management comprising:
receiving, at a gateway device, data from an application to be communicated via a packet-based protocol via a first socket and a second socket to a smart card web server, the first socket and the second socket in data communication with the gateway device;
transmitting the received data via the first socket via a bearer independent protocol channel to the smart card web server;
receiving, at the gateway device, a data response based at least in part on the transmitted data;
determining, at the gateway device, whether data communication is complete based at least in part on the received data response;
if the determination indicates data communication is complete:
transmitting a message from the gateway device to the smart card web server indicating closure of the first socket before receiving a socket close command for the first socket at the gateway device from the application, and
transmitting the received data via the second socket via the bearer independent protocol channel to the smart card web server; and
if the determination indicates data communication is incomplete, continuing transmission of the received data via the first socket to the smart card web server.

2. The method of claim 1, wherein the smart card web server comprises one or more of a subscriber identify module card, a universal subscriber identity module card, a universal integrated circuit card, a removable user identify module, and a CDMA subscriber identity module card.

3. The method of claim 1, wherein the packet-based protocol is HTTP.

4. The method of claim 3, wherein the data received from the application includes an HTTP request.

5. The method of claim 1, wherein at least one of the first socket and the second socket includes a TCP/IP socket.

6. The method of claim 1, further comprising generating a signal for packet-based transmission based on the received data response.

7. The method of claim 1, wherein determining whether data communication is complete comprises:
extracting a value from the received data response; and
comparing the extracted value to a value associated with the first socket.

8. The method of claim 7, wherein extracting the value includes extracting a value included in a header field of the received data response.

9. The method of claim 7, wherein extracting the value includes extracting a value included in a body of the received data response.

10. The method of claim 1, wherein determining whether data communication is complete comprises prior to determining data communication is complete, if additional data is received via the first socket, determining whether data communication is complete based on a signal received from the application.

11. An apparatus for managing socket connections, the apparatus comprising:
a client circuit configured to receive data from an application to be communicated via a packet-based protocol via a first socket and a second socket to a smart card web server;
a card circuit configured to:
transmit the received data via the first socket via a bearer independent protocol channel to the smart card web server; and
receive a data response based at least in part on the transmitted data from the smart card web server; and
a traffic analyzer configured to determine whether data communication is complete based at least in part on the received data response;
the client circuit configured to, if the determination indicates data communication is complete:
transmit a message to the smart card web server indicating closure of the first socket before receiving a socket close command for the first socket from the application, and
transmit the received data via the second socket via the bearer independent protocol channel to the smart card web server; and
the client circuit configured to, if the determination indicates data communication is incomplete, continue transmitting the received data via the first socket to the smart card web server.

12. The apparatus of claim 11, wherein the smart card web server comprises one or more of a subscriber identify module card, a universal subscriber identity module card, a universal integrated circuit card, a removable user identify module, and a CDMA subscriber identity module card.

13. The apparatus of claim 11, wherein the packet-based protocol is HTTP.

14. The apparatus of claim 13, wherein the data received from the application includes an HTTP request.

15. The apparatus of claim 11, wherein at least one of the first socket and the second socket includes a TCP/IP socket.

16. The apparatus of claim 11, wherein the card circuit is further configured to generate a signal for packet-based transmission based on the data received.

17. The apparatus of claim 11, wherein determining whether data communication is complete comprises:
extracting a value from the received data response;
comparing the extracted value to a value associated with the first socket.

18. The apparatus of claim 17, wherein extracting the value includes extracting a value included in a header field of the received data response.

19. The apparatus of claim 17, wherein extracting the value includes extracting a value included in a body of the received data response.

20. The apparatus of claim 11, wherein determining whether data communication is complete comprises prior to determining the transaction is complete, if additional data is received via the first socket, determining whether the transaction is complete based on a signal received from the application.

21. An apparatus for managing socket connections, the apparatus comprising:
means for client application communication configured to receive data from an application for communication via a packet-based protocol via a first socket and a second socket to a smart card web server, the first socket and the second socket to a smart card web server;

means for data communication configured to:
  transmit data the received data via the first socket via a bearer independent protocol channel to the smart card web server; and
  receive a data response based at least in part on the transmitted data from the smart card web server; and means for analyzing traffic configured to determine whether data communication is complete based at least in part on the received data response;

the means for client application communication configured to, if the determination indicates data communication is complete:
  transmit a message to the smart card web server indicating closure of the first socket before receiving a socket close command for the first socket from the application, and
  transmit the received data via the second socket via the bearer independent protocol channel to the smart card web server; and the means for client application communication configured to, if the determination indicates data communication is incomplete, continue transmitting the received data via the first socket to the smart card web server.

22. A non-transitory computer-readable storage medium comprising instructions executable by a processor of an apparatus, the instructions causing the apparatus to:
  receive data from an application for communication via a packet-based protocol via a first socket and a second socket to a smart card web server, the first socket and the second socket to a smart card web server;
  transmit the received data via the first socket via a bearer independent protocol channel to the smart card web server;
  receive a data response based at least in part on the transmitted data from the smart card web server;
  determine whether data communication is complete based at least in part on the received data response;
  if the determination indicates data communication is complete:
    transmit a message to the smart card web server indicating closure of the first socket before receiving a socket close command for the first socket from the application, and
    transmit the received data via the second socket the bearer independent protocol channel to the smart card web server; and
  if the determination indicates data communication is incomplete, continue transmitting the received data via the first socket to the smart card web server.

* * * * *